ative Examiner

United States Patent [19]

Kaufmann

[11] Patent Number: 4,793,525

[45] Date of Patent: Dec. 27, 1988

[54] APPARATUS FOR THE DOSING OF A PULVERULENT SOLID MATERIAL

[75] Inventor: Klaus Kaufmann, Hünenberg, Switzerland

[73] Assignee: Contraves AG, Zürich, Switzerland

[21] Appl. No.: 167,704

[22] Filed: Mar. 14, 1988

Related U.S. Application Data

[63] Continuation-in-part of Ser. No. 16,183, Feb. 17, 1987, abandoned.

[30] Foreign Application Priority Data

Feb. 21, 1986 [CH] Switzerland ............ 00696/86
Dec. 1, 1987 [CH] Switzerland ............ 04699/87

[51] Int. Cl.⁴ .................................... G01F 11/20
[52] U.S. Cl. ...................................... 222/333; 222/410; 222/504; 222/548; 464/30
[58] Field of Search ............... 222/330, 333, 342, 370, 222/408, 410–411, 484–485, 504, 547–548, 564, 643; 464/42, 45, 30, 160

[56] References Cited

U.S. PATENT DOCUMENTS

| 909,657 | 1/1909 | Patterson | 222/370 X |
|---|---|---|---|
| 1,559,905 | 11/1925 | Moorman | 222/185 |
| 2,636,646 | 4/1953 | Olsen | 222/510 X |
| 3,157,313 | 11/1964 | Sarmento et al. | 222/643 |
| 3,481,160 | 12/1969 | Georgi | 464/45 X |
| 3,526,341 | 9/1970 | Johnston | 222/333 X |

FOREIGN PATENT DOCUMENTS 633884 12/1982 Switzerland .

OTHER PUBLICATIONS

Knutson, Positive Discharge Hopper, IBM Disclosure Bulletin, (vol. 8 No. 12) May 1966.

Primary Examiner—Michael S. Huppert
Attorney, Agent, or Firm—Werner W. Kleeman

[57] ABSTRACT

A controlled coupling action between a distributor element and a rotary diaphragm is to be provided in an environment exposed to dust and powder within a dosing apparatus into which all kinds of materials, such as abrasive and chemically aggressive substances, but also materials intensifying sliding or adhesion properties are introduced for dosed delivery. To that end there are provided elastic form-locking coupling elements which, under increasing load, momentarily disengage the rotary connection between the distributor element and the rotary diaphragm. A preferred material pairing for the elastic form-locking coupling elements is metal, such as stainless steel, and polytetrafluoroethylene known as Teflon.

19 Claims, 2 Drawing Sheets

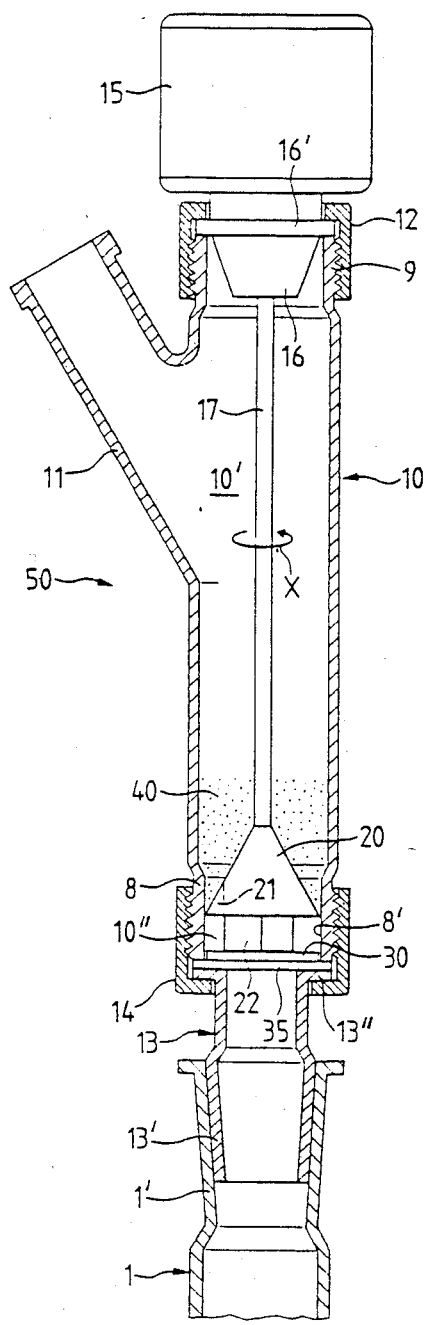
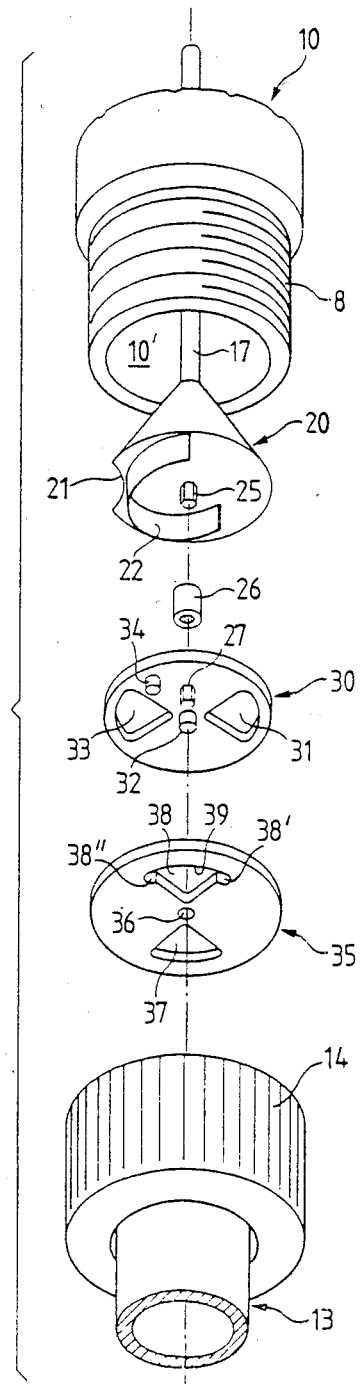
FIG. 1
FIG. 2

APPARATUS FOR THE DOSING OF A PULVERULENT SOLID MATERIAL

CROSS-REFERENCE TO RELATED APPLICATION

This application is a continuation-in-part of my commonly assigned, copending United States Patent Application Ser. No. 07/016,183, filed on Feb. 17, 1987, now abandoned, and entitled: "APPARATUS FOR THE DOSED DELIVERY OF A PULVERULENT SOLID MATERIAL".

BACKGROUND OF THE INVENTION

The present invention broadly relates to a new and improved apparatus for the dosing of solid materials, and more specifically, pertains to a new and improved apparatus for the dosing of a pulverulent solid material.

Generally speaking, the dosing apparatus of the present invention comprises a container for receiving the solid material and in which there is positioned a distributor element equipped with a conveyor member and operatively connected with a drive shaft for rotation in both directions. A rotary diaphragm is arranged below the distributor element. A base plate is operatively associated with and located below the rotary diaphragm. The rotary diaphragm and the base plate are rotatable relative to each other through an angle less than a full revolution. The rotary diaphragm and the base plate are each provided with at least one opening for the through-passage of the solid material. These openings can be closed by rotating the rotary diaphragm and the base plate relative to one another.

Such type of dosing apparatus is described in an early construction in U.S. Pat. No. 909,657 of Thomas S. Patterson, granted Jan. 12, 1909. The basic principle was applied in a dispenser for pulverulent to diaphragms control the dosed delivery and a simultaneously moved agitator allows the solid material to freely flow in the region of receiving and through-passage openings.

A substantial improvement of this principle, particularly in connection with an automated operation, was disclosed a good seventy years later by Pavel Lehky and Marie Lehky in Swiss Patent No. 633,884, published Dec. 31, 1982. The pulverulent material introduced into the container is distributed on a perforated diaphragm by means of a motor-driven conical distributor element and through which the pulverulent material can depart from the dosing apparatus. The pulverulent material is transported by a spiral shaped conveyor member which moves the material from the periphery to an opening in the middle of the perforated diaphragm.

The undesirable possibility exists with the aforementioned prior art dosing apparatus utilizing the aforedescribed motor drive and thus providing a substantially improved apparatus which can be employed in an automated operation, that during filling of such dosing apparatus with pulverulent solid material possessing very fluent or free-flowing properties, a part of such material will automatically move to the outlet opening or port and, without any rotary motion of the conveyor member, fall through the outlet opening or port and into, for example, a laboratory reactor.

This uncontrolled delivery or dosage could be avoided if it were possible to provide, in the sense of the Patterson dispenser, a closure diaphragm instead of only the perforated diaphragm used in Lehky's dosing apparatus. This closure diaphragm could be then opened and closed by the motor, since it concerns a motor-driven apparatus for automated operation.

However, it has been found that a satisfactory solution is not reached by simply combining a motor-driven distributor system with a rotary diaphragm which, in fact, can be found also in manually operated containers for spices or the like. The reason for this is that if pulverulent material is to pass through a closed rotary diaphragm, it is necessary to first open the rotary diaphragm by rotating it through a predetermined aperture angle. When the rotary diaphragm is open, the rotation must be continued because now the spiral-shaped conveyor member becomes effective by conveying material flowing in at the periphery towards the central zone of the open diaphragm. This means that after the opening operation a type of slip coupling between the motor and the rotary diaphragm should make this further motion possible.

It is well known that an environment containing dust and powder is not at all ideal for using a slip coupling. In the case of a laboratory dispenser there is the further unfavorable factor that all sorts of abrasive and chemically aggressive materials, but also materials which intensify sliding or adhesion properties, should be dosed by this apparatus, so that a controlled coupling action can only be expected when the coupling can be kept free from the influence of such materials. Naturally, this leads to sealing problems and increased costs for the manufacture and maintenance of the apparatus. Reliability in operation remains questionable.

SUMMARY OF THE INVENTION

Therefore, with the foregoing in mind, it is a primary object of the present invention to provide a new and improved construction of an apparatus for the dosing of a solid material, especially for the dosed delivery of pulverulent or granular solid materials, of example into a laboratory reactor, in a manner which does not exhibit the aforementioned drawbacks and shortcomings of the prior art constructions.

Another and more specific object of the present invention aims at providing a new and improved construction of an apparatus of the previously mentioned type which prevents an undesirable, premature partial emptying of the container of the dosing apparatus during filling of the solid material into the container through the provision of simple means which require little space and thus afford a controllable exact dosage of the pulverulent or granular solid material.

A further important object of the present invention aims at providing a new and improved construction of an apparatus for the dosing of a pulverulent solid material which solves the aforementioned coupling problem and thus assuring a failsafe coupling action for a controllable and exact dosage of the pulverulent solid material.

Yet a further significant object of the present invention aims at providing a new and improved construction of a material dosing apparatus which is relatively simple in construction and design, extremely economical to manufacture, highly reliable in operation, not readily subject to breakdown or malfunction and requires a minimum of maintenance and servicing.

Still another noteworthy object of the present invention aims at the provision of an improved construction of a dosing apparatus for pulverulent or granular solid materials which with very simple and space saving coupling components, affords a precise and reliable dosage of the pulverulent or granular solid materials.

Now in order to implement these and still further objects of the invention, which will become more readily apparent as the description proceeds, the dosing apparatus of the present invention is manifested, among other things, by the features that coupling means are provided for operatively connecting the distributor element to the rotary diaphragm. These coupling means comprise elastic form-locking elements which, under increasing load, momentarily disengage the rotary connection between the distributor element and the rotary diaphragm.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 1 is a longitudinal sectional view of a dosing apparatus for pulverulent or granular solid materials and constructed according to the present invention;

FIG. 2 is a partial section and exploded perspective view of the lower portion of the dosing apparatus in its dismantled state.

DETAILED DESCRIPTION OF THE PREFERRED EMBODIMENTS

Figure 3:
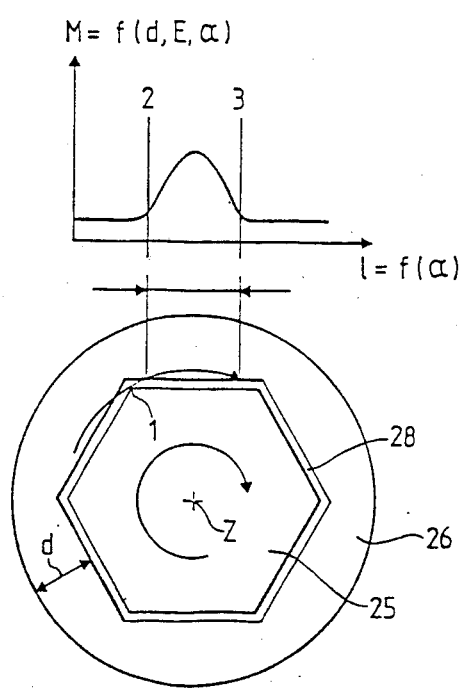
FIG. 3 is a schematic and sectional illustration of the coupling unit or means according to the present invention.

Describing now the drawings, it is to be understood that to simplify the showing thereof only enough of the structure of the dosing apparatus for pulverulent or granular solid materials has been illustrated therein as is needed to enable one skilled in the art to readily understand the underlying principles and concepts of this invention. Turning now specifically to FIG. 1 of the drawings, the structure illustrated therein by way of example and not limitation will be seen to comprise a dosing apparatus 50 shown in longitudinal sectional view. This dosing apparatus 50 comprises a container or receptacle 10 having a laterally positioned material filling connection or infeed stud 11 formed thereat and internally of the container 10 is a material receiving inner chamber or space 10' flow communicating with an intermediate chamber or space 10''. There is further provided a here merely schematically illustrated drive means 15, for example constituted by a suitable drive motor 15. Operatively connected with the drive motor 15 by means of a drive shaft 17 is a rotatable distributor or distribution element 20 which is shown to possess, for instance, a substantially conical configuration. A mounting or connection portion or component 13 is located at the lower portion of the dosing apparatus 50 for connection to a not particularly shown receiver or receiving vessel or container or the like, such as the vessel of a laboratory reactor. As the drive motor 15 there is preferably used an electric motor provided with a suitable displacement path measuring device or a step motor.

The drive motor 15, which is positioned in an upper recessed or stepped portion or region 9 of the container 10, is operatively connected with the drive shaft 17 by means of a schematically illustrated coupling portion or component 16. The drive shaft 17 is driven so as to rotate, for instance, in the direction of the arrow X. The coupling portion or component 16 forms a structural unit with the drive motor 15. Moreover, this coupling portion or component 16 bears by means of a support ring 16' on the container 10. The drive motor 15 to the upper stepped region or portion 9 of the container 10 by means of a suitable screw or threaded connection, here shown for instance as a first cap screw or clamping nut 12 or equivalent expedient.

At a lower likewise threaded recessed or stepped portion or region 8 of the container 10 there is detachably connected by means of a second cap screw or clamping nut 14 or equivalent structure the mounting portion of component 13. This mounting portion or component 13 is held by means of a support ring 13'' by the second cap screw or clamping nut 14. The mounting portion or component 13 is provided with a conical portion or region 13'. This conical portion or region 13' is inserted into a correspondingly conically shaped portion or region 1' of a connecting cone 1. This connecting cone 1 substantially forms the mounting or connection portion of a not particularly illustrated vessel or container for carrying-out chemical reactions in a not particularly illustrated but conventional reactor, for example a laboratory reactor.

The distributor element 20 which is operatively and fixedly non-rotatably connected in relation to, but with the drive shaft 17, is coaxially positioned in the lower recessed or stepped portion 8 of the container 10 and is guided at an inner wall 8' of this lower recessed or stepped portion 8. A worm-like or helical or spiral-shaped conveyor member 22 is arranged and attached to the distributor element 20 at the side thereof confronting the mounting or support component 13 and the support ring 13'', respectively. Two discoidal or plate-shaped elements 30, 35, which are schematically illustrated in FIG. 1, are arranged between the conveyor member 22 and the support ring 13'' of the mounting or connection component 13. One of these two- discoidal or plate-shaped elements is formed as a rotary or rotatable diaphragm 30 and the other of these two discoidal or plate-shaped elements is formed as a stationary base plate 35.

The rotary or rotatable diaphragm 30 is guided at the inner wall 8' of the lower recessed or stepped portion 8 of the container 10 and is operatively connected with the rotatable distributor element 20. The base plate 35 arranged between the lower edge of the recessed or stepped portion 8 of the container 10 and the support ring 13'' is secured against rotation, for example, by virtue of the clamping action exerted by the second cap screw or clamping nut 14 at the lower recessed or stepped portion 8 of the container 10.

The lower region of the dosing apparatus 50 is shown in an exploded view in a dismantled state in FIG. 2. Starting at the top of the structural unit illustrated in FIG. 2, a part of the shaft 17 is shown with the substantially conical distributor element 20 As explained, this shaft 17 is motor driven and operatively but non-rotatably connected with the distributor element 20. This rotatable distributor element 20 possesses a laterally arranged recess or opening 21 for the through-passage of pulverulent material or the like and the slightly spiral-shaped conveyor member 22 is distributor element 20. This conveyor member 22 transports the pulverulent solid material to the center when the distributor element 20 is rotated.

Below the distributor element 20, formed as a substantially conical body, there is disposed a rotary diaphragm 30 possessing two discharge openings 31 and 33 which are offset relative to one another. A base plate 35 possesses two discharge openings 37 and 38 which are offset relative to one another in the same manner as the discharge openings 31 and 33 of the rotary diaphragm 30. The rotary diaphragm 30 together with the base plate 35 form the part of the dosing apparatus which opens or closes the through-passage of the pulverulent solid material. The rotary diaphragm 30 and the base plate 35 can be rotatably inserted into or plug connected with each other by means of a centering pin 32 and a central through-pass bore 36.

In the assembled state, the base plate 35 is non-rotatably, the rotary diaphragm 30 rotatably disposed. To determine the closing and opening functions, the rotary diaphragm 30 is provided at the lower side facing the base plate 35 with a guide pin 34 which extends into recesses 38' and 38" formed in correspondence with the guide pin 34 and located at one of the discharge openings 37 and 38 of the base plate 35. In this way, the CLOSED/OPEN positions are clearly defined by the noncoincident or coincident positioning of the discharge openings 31 and 33 of the rotary diaphragm 30 with the corresponding discharge openings 37 and 38 of the base plate 35. In the opened position, the pulverulent solid material can be exactly dosed by the number of revolutions of the distributor element 20 with the conveyor element 22.

The connection between the motor-driven distributor element 20 and the rotary diaphragm 30 is effected by the coupling device or coupling means provided in accordance with the invention and comprising the coupling members or elements 25, 26 and 27, the function of which will be described in detail hereinafter in connection with the section of the coupling device or coupling means shown in FIGS. 2 and 3.

In the assembled state of the distributor element 20, the rotary diaphragm 30 and the base plate 35 which, as explained previously, is accomplished by means of the clamping nut or cap screw 14 fastened to threaded recessed or stepped portion 8, the distributor element 20 is operatively and rotatably connected with the rotary diaphragm 30 by means of the coupling device or means comprising the coupling members or elements 25, 26 and 27. The rotatability occurs when the torque or rotational moment exceeds a predetermined level. Below this torque or rotational moment level, the distributor element 20 and the rotary diaphragm 30 are rigidly connected for rotation with one another. On the other side or face of the rotary diaphragm 30, the latter is centrally guided by means of the centering pin 32 engaging in the central through-pass bore or bore means 36 of the base plate 35. The guide pin 34 located on the same side or face of the rotary diaphragm 30 extends into the discharge opening or aperture 38 add serves as a stop member to insure for the essentially coincident or aligned positioning of the discharge openings or apertures 31 and 33 of the rotary diaphragm 30 with the discharge openings or apertures 37 and 38 of the base plate 35.

Starting from a base or closed position in which the discharge openings 31 and 33 of the rotary diaphragm 30 are offset relative to the discharge openings 37 and 38 of the base plate 35, the pulverulent solid material is held back. When the drive motor 15 is started, the drive shaft 17 and with it the rotatable distributor element 20 including the spiral or helical conveyor member 22, as well as the rotary diaphragm 30, are rotated through a predetermined angle relative to the fixed or stationary base plate 35. The discharge opening 31 is thereby displaced substantially over the discharge opening 37 and the discharge opening 33 is displaced substantially over the discharge opening 38. As soon as the guide pin or pin member 34 located at the rotary diaphragm 30 engages the additional recess 38' in the discharge opening 38 in a direction opposite to the sense of rotation, the torque or rotational moment increases and the coupling device comprising the coupling members 25, 26 and 27 changes over from the non-relative rotary operation (where the members rotate but not relative to one another) to the rotary operation (where the members rotate relative to one another), thus insuring that the transport of the pulverulent solid material now occurring by means of the spiral conveyor member 22 can be maintained. When the reversible drive motor 15 is stopped and the direction of rotation is reversed, the through-passage of the pulverulent solid material through the discharge openings is again closed. In other words, the operation as hereinbefore described is now effected in the reverse direction. In this way, a step-by-step or intermittent delivery of pulverulent solid material is possible. Now, in order to implement this mode of operation as described hereinbefore, the coupling members of the coupling device will be now described hereinbelow and the function of such coupling device is as follows:

FIG. 3 shows the principle of this coupling device. As mentioned hereinbefore, this coupling device should substantially possess the characteristics of a slip or sliding coupling, wherein, however,, the principle of the slip or sliding coupling cannot be applied to this dosing apparatus for the reasons explained hereinbefore. The schematic illustration and sectional view of the coupling device snows the coupling member 25 constructed as a hexagonal coupling pin or pin member which is rigidly connected for rotation with the distributor element 20 for non-relative rotation in respect thereto, and the coupling member 26 is constructed as a coupling piece or element in the form of, for instance, a sleeve member, possessing a hexagonal recess or bore 28 instead of a through-bore there can be provided two blindhole bores) into which the coupling pin 25 is introduced. In one embodiment of the coupling device, the coupling piece 26 can be rigidly connected for non-relative rotation to the rotary diaphragm 30. In another embodiment of the coupling device, the coupling piece 26 is operatively connected with the rotary diaphragm 30 by means of a coupling member 27 also constructed as a hexagonal coupling pin which, on the one side, is firmly connected to the rotary diaphragm 30 and, on the other side, introduced into the hexagonal recess or bore 28 of the coupling piece 26.

Now, either the coupling pin or pin member 25 as well as the coupling pin or pin member 27, or the coupling piece or element 26, and if need be all three coupling members, are made of a material possessing, on the one hand, a modulus of elasticity which is substantially lower than that of solid metal and, on the other hand, a range of elasticity which is substantially larger than that of metal. In this connection, metal is to be understood in conventional sense and does not include lead, sodium or the like. When the drive motor 15 is started, the coupling pin 25 in the hexagonal recess or bore 28 of the stationary coupling piece 26 begins to rotate around a central point Z in the direction of the arrow depicted in FIG. 3. As soon as the edge 1, which is referenced and described herein but is representative for all the edges of the hexagonal coupling pin 25, contacts the inner wall of the hexagonal recess or bore 28 at the position 2, the torque or rotational moment increases to reach a peak value and then decreases to again assume the initial torque or rotational moment at the position 3. This operation corresponds to a rotation of the edge 1 through an angle of approximately 60° and is illustrated in the graph section of FIG. 3 which has been depicted between two edges of the coupling pin 25. Instead of a slipping or sliding action, an elastic deformation takes place and the force of this elastic deformation is beneficially utilized to move the rotary diaphragm 30. The maximum or peak force from the elastic deformation is such that the drive motor 15 can continue rotating the distributor element 20 in the set direction of rotation in spite of the stationary rotary diaphragm 30. In this application it is irrelevant that the coupling device has a wave-like resistance characteristic. On the other hand, what is significant is that the problem of contamination and soiling could be solved by replacing the frictional couple by a form-lock couple which can be overcome by a selectively applied force. The proper choice of material for the elastic coupling element will substantially inhibit chemical aggressiveness. In this connection, it is preferable to use an acetate plastic material, such as material from the POM (polyoxymethylene) family, such as POM-C group which possesses the proper mechanical as well as chemical properties. Despite all these considerable advantages, a plastic coupling member such as the coupling piece 26 is so extremely economical to manufacture that it can be considered as expendable material for replacement purposes. Yet a further advantage that should not be underestimated is the easy replaceability requiring actually one single manual operation to withdraw and replace a plastic coupling member.

The resistance against relative rotation of the coupling pin or pin member 25 and the coupling piece or element 26 should be sufficient to actuate the rotary diaphragm 30 also against minor resistances or obstacles caused, for instance, by jammed powder particles or slight adhesion However, the resistance should not be so great that the drive motor 15 is unnecessarily loaded. The parameters which determine this function are tee modulus of elasticity E of the selected material and the wall thickness d of the coupling piece 26. The wall thickness d is of importance as long as there still occurs an enlargement or widening of the inner circumference of the coupling piece 26 caused by the placement or clamping of the inner wall of the coupling piece 26 over the radius of each of the edges 1 which move along the smaller radii of the hexagonal surfaces of the inner wall of the coupling piece 26. The larger the wall thickness d, the more the compression forces (pressing) dominate the tension forces (elongation).

Tests have shown that the elastic coupling piece 26 in the relationships or proportions shown in FIG. 3 was intact after a large number of dosing operations. This technical robustness was surprising and definitely proved the usefulness and advantage of the inventive coupling principle. Nevertheless, it is recommendable to more frequently replace the elastic coupling member, particularly in the interest of avoiding contamination and soiling. The replacement of the elastic coupling member can be carried out when the dosing apparatus requires cleaning, for example, before a new chemical substance is introduced for dosed delivery.

The manufacture of the coupling piece 26 is simple. For example, a tube of plastic material can be broached by means of a hexagonal broach ram tool or the like. This can be done before or after the tube is cut to the length of the elastic coupling member. The coupling pins 25 and 27 can be fabricated of a metallic material or a hard plastic material, for example, Thermodur, and thus resist wear during their entire service life. The only wearing part is the coupling piece 26 for the transmission of motor power and this coupling piece 26 is economical to manufacture and also simple to replace.

The hexagonal profile is just one of several usable or suitable polygons or multi-edge structures. It is practical to use a polygonal profile possessing four to eight sides. The wear of the elastic coupling piece 26 will increase when using a profile with less than four sides. On the other hand, a polygonal profile with more than eight sides will increase the form locking capability, such that the coupling characteristic will successively approach that of a slip or sliding coupling with friction locking. A material with a too small range of elasticity will exhibit increasing plastic deformation in operation and thus impair operability. On the other hand, a material with a too high modulus of elasticity will unnecessarily load the employed drive motor. But even if a material fully meets the elasticity requirements, it is still not usable if the chemical resistance of the material is too low. Apart from the chemical decomposition of the material, the corroding material will also contaminate the free-flowing pulverulent chemical solid material.

The selection of the material for the flexible or elastic coupling member is therefore of great importance from the chemical as well as from the mechanical aspects. As mentioned hereinbefore, plastic materials from the POM family are very suitable, but also copolymers on this basis are usable. Less recommendable are natural and silicone rubbers including the hard variants, although they can be also considered, if necessary. Further advantageous material combinations or pairings can be found by considering the modulus of elasticity and the coefficient of friction as listed, for example, in the Dubbel Engineering Handbook, as well as the chemical compatibility as listed, for example, in the Merck Index and d'Ans-Lax, but nevertheless, the aforedescribed material recommendations are governing criteria. Stainless steel has proven to be good as the metallic material. It is known from experience that stainless steel is chemically very resistant and moreover easy to clean. Hard plastic material, known, for example, as Thermodur material, can be used in place of metallic material. A further variant could be the use of finest poriferous or fine pore materials, in other words, extremely smooth ceramic parts, although such materials have a relatively high cost and are not necessarily economical to manufacture.

As hereinbefore mentioned, either the coupling pins 25 and/or 27, or the coupling piece 26, or then all three coupling members are manufactured from plastic material which, because of its modulus of elasticity, provides the required coupling property. Systematically considered, the following combinations or pairings are possible, such that:

a coupling member 25 arranged for non-relative rotation at the distributor element 20 is fabricated from a material of greater elasticity than the counter coupling member (parts 26, 27) arranged for non-relative rotation at the rotary diaphragm 30;

a coupling member 25 arranged for non-relative rotation at the distributor element 20 is fabricated from a material of lower elasticity than the counter coupling member (parts 26, 27) arranged for non-relative rotation at the rotary diaphragm 30;

a first coupling member 25 arranged for non-relative rotation at the distributor element 20 is fabricated from a material of greater elasticity than a second coupling member 27 arranged for non-relative rotation at the rotary diaphragm 30 and a third coupling member 26 releasably arranged between the first coupling member 25 and the second coupling member 27;

the third coupling member 26 is fabricated from a material of greater elasticity than the first coupling member 25 and the second coupling member 27;

the second coupling member 27 is fabricated from a material of greater elasticity than the first coupling member 25 and the third coupling member 26;

the first coupling member 25 and the second coupling member 27 are fabricated from an elastic material of greater elasticity than the third coupling member 26;

the second coupling member 27 and the third coupling member 26 are fabricated from an elastic material of greater elasticity than the first coupling member 25; and the first coupling member 25 and the third coupling member 26 are fabricated from an elastic material of greater elasticity than the second coupling member 27.

Although not all of these systematically listed variants are constructively advantageous, they are nevertheless all functionally acceptable in accordance with the present invention. Furthermore, an analogous systematic listing of the geometric variants in contrast to the material-characteristic variants hereinbefore described actually leads to the same results. The form-locking coupling device comprises a positive n-sided polygonal member interfitting with a negative n-sided polygonal member. These two interlocking members can be, for instance, constructed as a coupling pin and a coupling sleeve.

It has been found advantageous if at least one of the coupling members is formed of a material having a modulus of elasticity (E) smaller than $28.10^5$ N/cm$^2$.

The systematic combination of the material characteristics and the geometric properties of the coupling members leads to a far greater number of variants which all function except, if compared in a logical truth table, the equivalences (all elements the same, such as pins, sleeves and elasticity) and systematically the antivariants (exclusive-OR) should be sorted out.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. An apparatus for the dosing of a pulverulent solid material, comprising:
   a container for receiving the solid material;
   a distributor element positioned within said container;
   drive means including a drive shaft with which there is operatively connected said distributor element for selective rotation in opposite directions of rotation;
   a rotary diaphragm arranged below said distributor element;
   a base plate operatively associated with and located below said rotary diaphragm;
   said rotary diaphragm having at least one discharge opening for the through-passage of the solid material;
   said base plate being provided with at least one discharge opening for the through-passage of the solid material;
   said rotary diaphragm and said base plate being rotatable relative to each other through an angle less than a full revolution, such that said at least one discharge opening of said rotary diaphragm and said at least one discharge opening of said base plate can be closed by rotating said rotary diaphragm and said base plate relative to one another;
   coupling means for providing a rotary connection between said distributor element and said rotary diaphragm; and
   said coupling means including elastic form-locking elements for momentarily disengaging, under increasing load, the rotary connection between said distributor element and said rotary diaphragm.

2. The apparatus as defined in claim 1, wherein:
   said elastic form-locking elements comprise at least one coupling member of polygonal section and at least one coupling member possessing at least one polygonal recess corresponding with said polygonal section, such that said at least one coupling member of polygonal section operatively interfits with said at least one coupling member possessing at least one polygonal recess; and
   at least one coupling member of the two interfitting coupling members is formed of a material having a modulus of elasticity smaller than $E=28.10^5$ N/cm$^2$.

3. The apparatus as defined in claim 2, wherein:
   one of said two interfitting coupling members is mounted at said distributor element; and
   the other of said two interfitting coupling members is mounted at said rotary diaphragm.

4. The apparatus as defined in claim 2, wherein:
   said at least one coupling member of polygonal section comprises a pin member.

5. The apparatus as defined in claim 2, wherein:
   said at least one coupling member provided with at least one polygonal recess comprises a sleeve member having a polygonal through-bore.

6. The apparatus as defined in claim 2, wherein:
   said at least one coupling member provided with at least one polygonal recess comprises a sleeve member having two polygonal blindhole bores.

7. The apparatus as defined in claim 1, wherein:
   said elastic form-locking elements comprise a pair of coupling members each possessing a first predeterminate polygonal structure and a single coupling member possessing a second predeterminate polygonal structure, such that said pair of coupling members is operatively connected with said single coupling member.

8. The apparatus as defined in claim 7, wherein:
   said pair of coupling members are made of metallic material;

one of said pair of coupling members is firmly mounted at said distributor element;

the other of said pair of coupling elements is firmly mounted at said rotary diaphragm; and said single coupling member being located between said pair of coupling members and being made of plastic material.

9. The apparatus as defined in claim 8, wherein:

said coupling member firmly mounted at said distributor element is made of a material of greater elasticity than said other coupling member firmly mounted as a counter coupling half at said rotary diaphragm.

10. The apparatus as defined in claim 8, wherein:

said coupling member firmly mounted at said distributor element is made of a material of lower elasticity than said other coupling member firmly mounted as counter coupling half at said rotary diaphragm.

11. The apparatus as defined in claim 8, wherein:

said one of said pair of said coupling members firmly mounted at said distributor element is fabricated from a material of greater elasticity than said other one of said pair of coupling members firmly mounted at said rotary diaphragm and said single coupling member releasably arranged between said pair of coupling members.

12. The apparatus as defined in claim 8, wherein:

said single coupling member is fabricated from a material of greater elasticity than said pair of coupling members.

13. The apparatus as defined in claim 8, wherein:

said other one of said pair of said coupling members firmly mounted at said rotary diaphragm is fabricated of coupling members firmly mounted at said distributor element and said single coupling member releasably arranged between said pair of coupling elements.

14. The apparatus as defined in claim 8, wherein:

said pair of coupling members is fabricated from a material of greater elasticity than said single coupling member releasably arranged between said pair of coupling elements.

15. The apparatus as defined in claim 8, wherein:

said other one of said pair of coupling members firmly mounted at said rotary diaphragm and said single coupling member releasably arranged between said pair of coupling elements are fabricated of a material of greater elasticity than said one of said pair of coupling members firmly mounted at said distributor element.

16. The apparatus as defined in claim 8, wherein:

said one of said pair of coupling members firmly mounted at said distributor element and said single coupling member releasably arranged between said pair of coupling members are fabricated from a material of greater elasticity than said other one of said pair of coupling members firmly mounted at said rotary diaphragm.

17. The apparatus as defined in claim 2, wherein:

said polygonal section is a m-sided to n-sided polygon, wherein m=3 and n=12.

18. The apparatus as defined in claim 17, wherein:

said polygonal section is a hexagon.

19. The apparatus as defined in claim 2, wherein:

said flexible coupling member is made of a material of the POM-C family or a modification thereof.

* * * * *

UNITED STATES PATENT AND TRADEMARK OFFICE
CERTIFICATE OF CORRECTION

PATENT NO. : 4,793,525

DATED : December 27, 1988

INVENTOR(S) : KLAUS KAUFMANN

It is certified that error appears in the above-identified patent and that said Letters Patent is hereby corrected as shown below:

Column 1, line 37, after "to" please insert --granular solid materials. Two relatively moveable rotary--

Column 2, line 40, after "materials," please delete "of" and insert --for--

Column 4, line 10, after "15" please insert --and the coupling portion or component 16 are detachable secured--

Column 4, line 19, please delete "of" and insert --or--

Column 4, line 44, please delete "two-" and insert --two--

Column 4, line 63, after "20" please insert --.-- (period)

Column 5, line 1, after "is" please insert --disposed at the lower side or face of such rotatable--

Column 5, line 61, please delete "add" and insert --and--

UNITED STATES PATENT AND TRADEMARK OFFICE
CERTIFICATE OF CORRECTION

PATENT NO. : 4,793,525

DATED : December 27, 1988

INVENTOR(S) : KLAUS KAUFMANN

It is certified that error appears in the above-identified patent and that said Letters Patent is hereby corrected as shown below:

Column 6, line 38, please delete "however,," and insert --however,--

Column 6, line 42, please delete "snows" and insert --shows--

Column 6, line 49, please delete "instead" and insert --(instead--

Column 7, line 49, after "adhesion" please insert --.--(period)

Column 7, line 51, please delete "tee" and insert --the--

Column 12, line 1, after "cated" please insert --from a material of greater elasticity than said one of said pair--

Signed and Sealed this

Eleventh Day of July, 1989

Attest:

DONALD J. QUIGG

Attesting Officer

Commissioner of Patents and Trademarks